United States Patent [19]

Serres, Jr.

[11] 4,307,012

[45] Dec. 22, 1981

[54] POLYMERIC ALKYLBENZENOID HYDROQUINOID ANTIOXIDANTS

[75] Inventor: Carl Serres, Jr., Naperville, Ill.

[73] Assignee: Standard Oil Company, Chicago, Ill.

[21] Appl. No.: 104,090

[22] Filed: Dec. 17, 1979

[51] Int. Cl.$^3$ .................. C08K 5/36; C07C 149/36; C07C 39/12; C08K 5/13
[52] U.S. Cl. .................. 260/45.95 R; 260/45.95 C; 260/45.95 G; 252/48.2; 252/52 R; 252/404; 260/398.5; 44/76; 44/78; 525/384; 525/397; 525/334; 528/205; 568/720; 568/638
[58] Field of Search .................. 260/45.95 R, 398.5; 528/205; 525/384, 334, 397; 568/720, 638; 252/404, 48.2, 52 R; 44/76, 78

[56] References Cited

U.S. PATENT DOCUMENTS

| | | | |
|---|---|---|---|
| 3,418,397 | 12/1968 | Tocker | 260/900 |
| 3,424,821 | 1/1969 | Hunter | 260/45.95 E |
| 3,930,047 | 12/1975 | Dale et al. | 252/404 |
| 3,994,828 | 11/1976 | Zaffaroni | 252/404 |
| 3,996,160 | 12/1976 | Dale et al. | 528/205 |
| 3,996,198 | 12/1976 | Wang et al. | 528/205 |
| 3,996,199 | 12/1976 | Weinshenker et al. | 528/205 |
| 4,054,676 | 10/1977 | Weinshenker et al. | 252/404 |

*Primary Examiner*—V. P. Hoke
*Attorney, Agent, or Firm*—William C. Clarke; William T. McClain; William H. Magidson

[57] ABSTRACT

Compositions of oxidizable organic materials having stabilizing amounts of polymeric alkylbenzenoid hydroquinoid antioxidants of from about 500 to about 50,000 molecular weight, and polymers which are the reaction products of a hydroquinone compound and a polymeric monohydroxy alkylbenzenoid compound.

23 Claims, No Drawings

POLYMERIC ALKYLBENZENOID HYDROQUINOID ANTIOXIDANTS

BACKGROUND OF THE INVENTION

This invention relates to stabilization of oxidizable organic materials with polymeric benzenoid hydroquinoids. This invention also relates to polymeric benzenoid hydroquinoids as new chemicals as well as to the oxidative stabilization of foodstuffs and organic materials subject to the deleterious effects of oxidative deterioration. These benzenoid hydroquinoid compounds are generally useful as antioxidants and age resistors for the preservation of materials which deteriorate in the presence of oxygen and on aging, and are particularly valuable as antioxidants for vegetable oils and fats for edible use.

Oxidation of fats and oils in consumable (edible) materials is an especial problem as such oxidation can render foodstuffs unpalatable and unfit for consumption. Of the three major components of edible materials which are protein, carbohydrates and lipids (which include fats and oils), lipids, i.e., the fats and oils, are most subject to oxidative degradation.

A variety of materials have been proposed as additives to inhibit undesired oxidation. Typically, these materials have a hydroquinone or phenolic structure. Among those commonly used are butylated hydroxy anisole (BHA) and butylated hydroxy toluene (BHT). BHA and BHT are readily soluble in fats and oils, are considered to be non-toxic and can be used in small quantities to inhibit or retard rancidity. However, the use of BHA and BHT is under attack since upon ingestion with foods these materials pass through the gastrointestinal tract walls into the blood stream and vital organs where their presence and safety to the host body is alleged to be of doubtful consequence. Observed pathological effects, carcinogenic potential, interactions with enzymes and lipids, effects on reproduction (Branen, A. L., J.O.A.C.S. 52:59 (1975)) have indicated the long-term safety of BHA and BHT is at least subject to controversy.

Other important considerations besides toxicity in applying antioxidants to vegetable oils to achieve optimum results are that the antioxidant not contribute an objectionable odor, color or flavor, and have complete solubility in the fats and oils at treatment levels sufficient to obtain good stability results. An increased antioxidant activity with complete solubility permits lower treatment levels. Accordingly, it is becoming recognized that any new approach to the problem of incorporating antioxidant materials in edibles requires a neat balancing of desirable characteristics which cannot be predicted on the basis of chemical structure.

In the prior art, Sommabend, U.S. Pat. No. 3,128,259 teaches the concept of preparing synthetic polymeric resins containing phenolic hydroxyl groups which are further reacted to prepare polyhydric alcohols adapted to prepare drying-oil esters and alkyl resins. Hunter, U.S. Pat. No. 3,424,821 teaches a composition wherein di(secondary alkyl) hydroquinones are reacted with a polymer such as styrene to obtain antioxidants suitable for polymers or vegetable oils. Zaffaroni, U.S. Pat. No. 3,994,828 teaches that fixing an antioxidant phenolic moiety to a polymer molecule of sufficient size to prevent passage through the walls of the gastrointestinal tract provides an antioxidant suitable for substantial nonabsorbtion from the gastrointestinal tract. Dale et al., U.S. Pat. No. 3,930,047, teaches monohydroxy polystyrene polymeric phenolic antioxidants which could easily be varied in molecular size to achieve desired nonabsorption through the walls of the intestinal tract. The materials of '047 are homopolymers of alpha-(2-hydroxy-3,5-di-lower alkylphenyl) ethylvinyl benzene or alpha-(2-hydroxy-3-lower alkylphenyl)ethylvinyl benzene which exhibit antioxidant activity in fats, oils and other foodstuffs. The antioxidants of '047 are monohydroxy compounds. Dale et al., U.S. Pat. No. 3,996,160, teaches ring polymerized hydroquinoid polymers having antioxidant activity for foods wherein the polymers are prepared from the copolymerization of a diolefinic hydrocarbon, a hydroquinoid and optionally a phenolic. The olefinic hydrocarbon preferably is a divinylbenzene, the hydroquinoid is preferably hydroquinone and other 1,4-dihydroxybenzenes. Suitable phenolic compounds are phenol, cresols, dimethyl, ethyl and butylphenols as well as bisphenol-A. Use of a solvent is indicated in Example IX of '160 in a blend of cottonseed and soybean oil, the sample containing 0.5 ml benzene to 50 ml vegetable oil. Th phenolic moieties are not of the polymeric chain but attach as separate moieties to the hydroquinone moiety. Wang et al., U.S. Pat. No. 3,996,198 teaches what is essentially a linear polymer prepared from preferably divinylbenzenes, phenolic reactants preferably such as phenol, the cresols, dimethyl ethyl and butyl phenols. The polymer of '198, according to the depicted structure, contains one equivalent of aromatic moiety which does not contribute antioxidant activity to the polymer since it is void of functional groups. Use of a solvent is indicated in Example VIII of '198 in a blend of cottonseed oil and soybean oil, the sample containing 0.5 ml benzene to 50 ml vegetable oil. Similar compounds for antioxidant use are taught in U.S. Pat. Nos. 3,996,199 and 4,054,676 wherein polymeric antioxidants are prepared from vinylbenzenes, a hydroquinone and certain phenolic compounds.

Accordingly a number of polymeric antioxidants have been prepared which are distinguished by the moieties contained in the polymer molecules, methods of preparation and consequent properties. However, as a rule, many of the antioxidants are not markedly superior in their antioxidant and other properties to BHT and BHA.

Since it is known from the prior art that hydroquinones such as tert-butylhydroquinone have been used as antioxidants in edibles, it is a primary object of this invention to provide a compound wherein the hydroquinone moiety with its antioxidant properties is contained in repeating units of the polymer chain. Another object is to provide a compound with antioxidant properties superior to BHT and BHA wherein the molecule is soluble in fats and vegetable oils and is of sufficient molecular size as to achieve nonabsorption through the walls of the gastrointestinal tract. Other objects appear hereinafter.

SUMMARY OF THE INVENTION

This invention relates to compositions of oxidizable organic materials having stabilizing amounts of polymeric alkylbenzenoid hydroquinoids of high molecular weight and to polymers which are the reaction product of a hydroquinone compound and a polymeric monohydroxyalkylbenzenoid compound.

DETAILED DESCRIPTION OF THE INVENTION

Polymeric alkylbenzenoid hydroquinoids of high molecular weight are prepared by an improved process by reacting a hydroquinone compound and a polymeric monohydroxyalkylbenzenoid compound. The polymeric monohydroxyalkylbenzenoid compound is prepared by reacting a suitable aromatic polymer with an acyl compound capable of reacting with the aromatic ring of the aromatic polymer under conditions of a Friedel-Crafts reaction to produce an acylated polymer. The acylated polymeric molecule is thereupon reduced to an alpha-hydroxy compound to form a polymeric alcohol. The alpha-hydroxy compund is thereupon reacted with an antioxidant molecule such as hydroquinone. The general equation for the reaction is

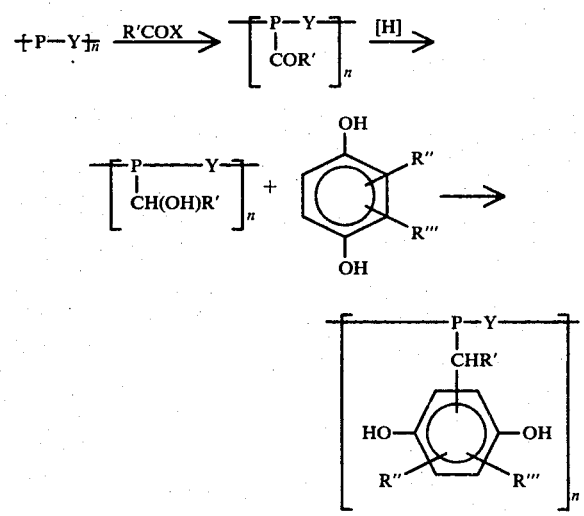

P is selected from the group consisting of

and aromatic moieties consisting of phenyl, moieties, substituents on said aromatic moieties comprising one or more alkyl groups of 1 to 26 carbon atoms. R is selected from the group consisting of hydrogen and alkyl groups of 1 to 26 carbon atoms, such as methyl, ethyl, isopropyl, t- and n-butyl to hexacosyl. Ar is selected from the group consisting of phenyl, naphthyl, biphenyl, diphenylether, diphenylsulfide, diphenylmethane, thiophene, benzothiophene, dibenzothiophene, pyrrolyl, pyridyl, and furyl moieties. Ar moieties can be substituted with one or more alkyl groups of 1 to 26 carbon atoms. Y is selected from the group consisting of —CH$_2$—, —O—, —S—, —CH(CH$_3$)—, —C(CH$_3$)$_2$—, —CH$_2$CH$_2$— and a phenyl moiety. R$_{40}$ is selected from the group consisting of, an alkyl moiety of 1 to 26 carbon atoms, a benzenoid moiety of 6 to 24 carbon atoms and a hetercyclic moiety comprising at least five atoms in the ring structure of which at least one is a carbon atom and containing one or more atoms selected from the group consisting of sulfur, nitrogen, oxygen and phosphorus atoms. X is halogen, —OH or RCOO—. R" and R''' are independently selected from the group consisting of hydrogen and an alkyl group of 1 to 26 carbon atoms; n is an integer from 2 to 200 for a molecular weight of from 500 to 50,000. P is preferably

or phenyl; R is preferably hydrogen or a methyl group; Y is preferably a methylene group; R' is preferably a methyl or phenyl group; R" is preferably hydrogen; X is preferably chlorine; R''' is preferably a tert-butyl group. n is preferably an integer from 1 to 20. Ar is preferably a phenyl group.

When P is

Ar a phenyl moiety, and Y is —CH$_2$—, the general equation is:

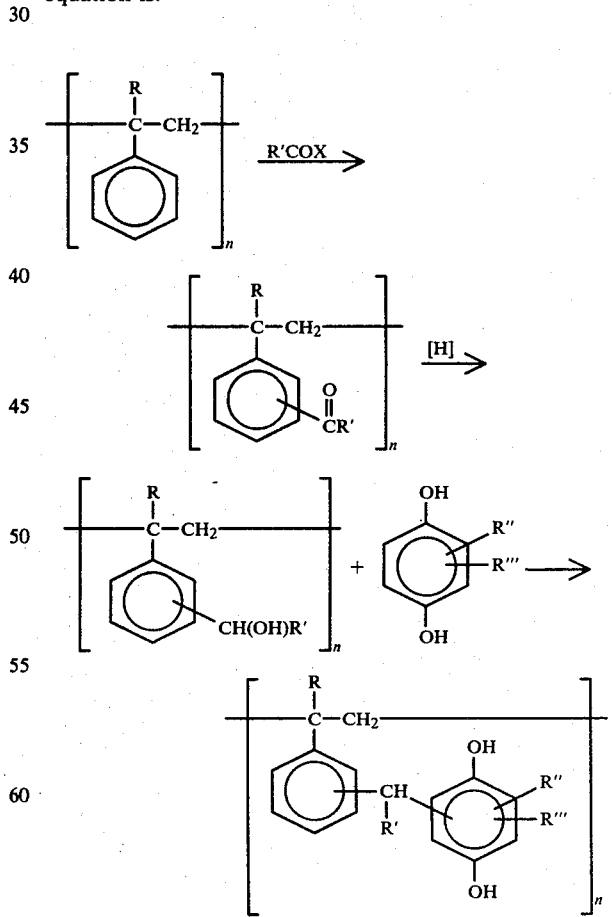

Similarly, when P is a phenyl moiety and Y is —CH$_2$—, the resulting compound is

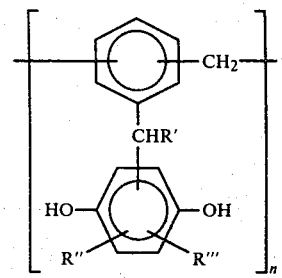

P is a dimethyl phenyl group and Y is —O—, the resulting compound is

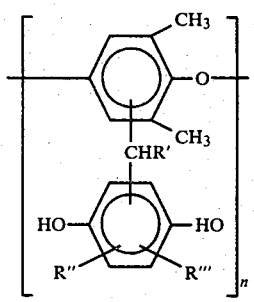

These compounds can be used as antioxidants in fats and vegetable oils and edible consumables, as well as other organic materials such as polymers, animal and mineral oils, fish oils, gasoline, etc. which are normally subject to deterioration upon exposure to air, heat and light. Fats and vegetable oils and edible consumables include glyceride oils such as corn oil, sunflower oil, cottonseed oil, safflower oil, soybean oil, peanut oil, etc., as well as animal fats such as lard and fish oils such as menhaden and sardine oils. These antioxidants of the present invention can be added to a wide variety of foods such as baked goods, processed canned fruits, vegetables and juices, meat products such as hams, sausage and bacon, and other food products such as essential oils, oil-soluble vitamins, peanut butter, mayonnaise, margarine, as well as milk products such as cheese, butter and so forth. Hydrocarbon polymers, including polyolefins (e.g., polyethylene plastic, crosslinked polyethylene, polypropylene, ethylene-propylene copolymer, etc.), diene polymers such as polybutadiene or polyisoprene homopolymer or copolymers of dienes with copolymerizable monoethylenically unsaturated monomers, e.g., styrene, acrylonitrile, isobutylene, vinyl pyridine, acrylic acid, acrylates, ethylene, propylene, etc., as in butadiene-styrene copolymer, butadiene-acrylonitrile copolymer, isobutylene-isoprene copolymer, ethylene-propylenediene (e.g., dicyclopentadiene, ethylidene norbornene, methylene norbornene, 1,4-hexadiene, cyclooctadiene, etc.) terpolymers, etc, can be stabilized, using the present chemicals as antioxidants, as can such polymers as polyurethanes, polycarbonates, polyesters, polyvinyl chloride, styrene acrylonitrile resin, ABS polymers, etc. These and other uses will be apparent to those skilled in the art to which the present invention pertains from the following specification.

In oxidizable edible products such as glyceride edible oils, fats, essential oils, nuts, and flavorings, an effective amount of these antioxidant materials is within the range of from about 2 to about 10,000 parts per million by weight, basis oxidizable substance or material, or preferably from about 5 to about 1,000 parts per million by weight. When these antioxidant materials are mixed with plastics, rubbers, gasoline, etc., an effective amount of these antioxidants is within the range of from about 2 to 50,000 parts per million, basis oxidizable substance. In such use, as in plastics and rubbers, these materials offer the advantage of being substantially non-volatile and thus not likely to be lost by migration and/or vaporization.

The initial aromatic polymer required for preparation of the hydroxyalkylbenzenoid polymers can be an alkyl benzenoid polymer containing 1 to 3 benzene rings wherein the alkyl moiety is from 1 to 26 carbon atoms. Preferably, the aromatic polymer is selected from the group consisting of polystyrene, poly(alpha-methylstyrene), poly(vinyltoluene), poly(2,6-dimethylphenylene oxide) and polybenzenoids such as polyphenylene. The acyl compound can be represented by the formula R'COX wherein R' is selected from the group consisting of an alkyl group of 1 to 26 carbon atoms, a benzene moiety, a naphthalene moiety, biphenyl moiety, a diphenyl alkane moiety, a phenylether moiety, a heterocyclic moiety of five or more atoms in the ring structure of which one or more atoms is selected from the group consisting of nitrogen, sulfur, phosphorus and oxygen and of which also contains at least one carbon atom. The heterocyclic moiety can be selected from the group consisting of a thiophene moiety, a benzothiophene moiety, a dibenzothiophene moiety, a pyrrolyl moiety, a pyridyl moiety and a furyl moiety. R' of the acyl compound is preferably an alkyl group of 1 to 12 carbon atoms, most preferably a methyl group. X can be halogen, a hydroxyl group or an acid anhydride group. X is preferably chlorine.

The hydroquinone compounds useful in my invention are hydroquinone, tertiary alkyl hydroquinone compounds such as 2,5-ditertiary butyl hydroquinone; 2,5-ditertiary amyl hydroquinone, and other alkyl and aralkyl substituted 1,4-dihydroxybenzenes wherein the alkyl groups have from 1 to 26 carbons inclusive and the aralkyls have from 7 to 26 carbons inclusive. Suitable hydroquinonoid reactants include, for example, 1,4-dihydroxybenzene; 2,3- or 2,5- or 2,6-dimethyl-1,4-dihydroxybenzene; 2-ethyl-1,4-dihydroxybenzene; 2-t-butyl-1, 4-dihydroxybenzene; 2-methyl-5-t-butyl-1,4-dihydroxybenzene; 2-(2-phenylethyl)1,4-dihydroxybenzene; and 2,4-di(2-(4-vinyl) phenylethyl)-1,4-dihydroxybenzene. Preferred hydroquinonoid reactants include hydroquinone and 1,4-dihydroxybenzenes carrying one lower branched or linear alkyl group of from 1 to 5 carbon atoms. Such preferred materials can be further defined as being in accordance with the following:

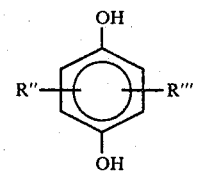

wherein R" and R"' individually are either hydrogen or a 1 to 5 carbon atom alkyl. Hydroquinone, 2-methyl-, 2-t-amyl- and 2-t-butyl-1,4-dihydroxybenzene are most preferred hydroquinonoid reactants. Mixtures of two or more hydroquinonoid reactants may be employed.

In summary, the process for producing the desired antioxidant compounds consists of three steps: (A) a Friedel-Crafts reaction of an aromatic polymer with an acyl compound wherein the polymeric ketone which results is suitable for conversion to a polyalcohol; (B) reduction of the resulting polymeric ketone to a polyalcohol by any suitable means; (C) condensation of the polyalcohol with a molecule possessing antioxidant properties such as hydroquinone to form a polymeric alkylebenzenoid hydroquinoid wherein the dihydroxybenzenoid moiety is contained in repeating units of the polymer chain.

The reaction conditions used for synthesizing the desired products and intermediate compounds used for producing the desired products Step (A) are conventional reaction conditions. The reaction of the polymer with the acyl chloride is usually carried out by intimately contacting and reacting the reactants optionally in the presence of a solvent for a time sufficient for them to react, usually about 1 minute to about 6 hours or longer at reaction temperatures of about −20° C. or less to 200° C. or higher and usually at room temperature of about 25° C. or at slightly elevated temperatures. The product is recovered from the reaction vessel by procedures such as the evaporation of the aqueous or organic solvents, by the addition of miscible solvents of low polarity, by chilling the mixture to precipitate the product, and the like.

Representative acid catalysts suitable for performing the Friedel-Crafts reaction in Step (A) are p-toluenesulfonic acid, hydrochloric acid, anhydrous hydrobromic acid, sulfuric acid, Lewis acids such as aluminum chloride, boron trifluoride, boron trichloride etherate, boron trifluoride etherate, stannic chloride, titanium tetrachloride and the like.

Reduction of the polymeric ketone in Step (B) can be by any suitable reaction such as a Meerwein-Ponndorf reaction, or a catalytic reduction with hydrogen and a catalyst selected from the group consisting of platinum and palladium, or with metal hydrides.

The reaction between the 1-hydroxyalkylbenzenoid moiety and the dihydroxy antioxidant such as hydroquinone in Step (C) is catalyzed by a suitable catalyst such as para-toluene sulfonic acid, aluminum, chloride, boron trifluoride, etc.

Accordingly, the invention relates to compositions comprising a polymeric alkylbenzenoid hydroquinoid compound and an oxidizable organic material normally subject to adverse effects by oxygen selected from the group consisting of edible fats and oils, polymers, animal and mineral oils and gasoline stabilized against oxidative degradation by having incorporated therein a stabilizing amount of said polymeric alkylbenzoid hydroquinoid wherein the said monohydroxyalkylbenzenoid hydroquinoid polymer is of a molecular weight ranging from about 500 to about 50,000 and which is preferably a polymer of a hydroxy alkylaromatic compound or derivative thereof.

Accordingly the invention relates to a polymeric alkylaromatic hydroquinoid compound of the formula

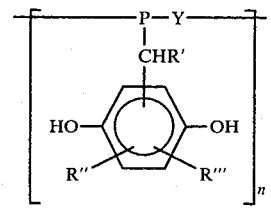

wherein P is selected from the group consisting of

and substituted and unsubstituted aromatic moieties comprising phenyl, substituents of said substituted aromatic moieties comprising one or more alkyl groups of 1 to 26 carbon atoms, and wherein R is hydrogen or an alkyl group of 1 to 26 carbon atoms. Ar is a cyclic moiety capable of reacting with an acyl compound under conditions of a Friedel-Crafts reaction. Ar accordingly is any benzenoid ring moiety or heterocyclic moiety of aromatic character.

Ar can be selected from the group consisting of a benzenoid moiety of 6 to 24 carbon atoms, a heterocyclic of aromatic character containing five to seven ring atoms of which at least one is a carbon atom and containing in the ring at least one atom selected from the group consisting of sulfur, nitrogen, oxygen and phosphorus. Ar can be substituted with an alkyl group of 1 to 26 carbon atoms. Y is selected from the group consisting of —CH$_2$—, —O—, —S—, —CH(CH$_3$)—, —C(CH$_3$)$_2$—, and phenyl moieties. R' is selected from the group consisting of an alkyl moiety of 1 to 26 carbon atoms, and a cyclic moiety selected from the group consisting of phenyl, naphthyl, anthranyl, phenanthryl, thienyl, benzothienyl, dibenzothienyl, pyrrolyl, pyridyl and furyl moieties. R" and R''' are independently selected from the group consisting of hydrogen and an alkyl group of 1 to 26 carbon atoms. n is an integer of from 2 to 200. Ar accordingly comprises an unsubstituted or substituted moiety selected from the group consisting of phenyl, naphthyl, biphenyl, diphenylether, diphenylsulfide, diphenylmethane, thienyl, benzothienyl, dibenzothienyl, pyrrolyl, pyridyl and furyl moieties. Ar can be substituted with one or more groups independently selected from methyl, ethyl, propyl, isopropyl, butyl, etc. to hexacosyl groups.

In another important aspect, the invention is concerned with a method of making the alkylbenzenoid hydroquinoids by reacting a mixture of an alpha-hydroxy alkylaromatic compound and a hydroquinone compound containing at least one replaceable hydrogen and one alkyl group of 1 to 26 carbon atoms in the presence of a catalytic amount of an acid catalyst at a temperature of from −20° to 200° C. for a period of from about 1 minute to about 6 hours, the compounds being employed in preferably molecular proportions of 1 mole of aromatic polymer compound to two or more moles of hydroquinone compounds. The polyfunctional characteristics of these compounds require that the molecular proportions preferably be in the ratios cited. An excess of the polymeric compound leads to increased cross-linking which would cause reduced solubility in vegetable oils and fats. An excess of the hydroquinone compound is required to prevent this cross-linking reaction.

In order to facilitate a clear understanding of my invention, the following specific embodiments are described in detail. It should be understood, however, that the detailed expositions of the application of this invention, while indicating preferred embodiments, are given by way of illustration only since various changes and modifications within the spirit and scope of this invention will become apparent to those skilled in the art from this detailed description.

EXAMPLE I

A. Thirty grams of aluminum chloride and acetyl chloride (15.5 g., 14 ml, 0.2 M) were added to 400 ml carbon disulfide. Then 23.6 poly(alphamethylstyrene) (mol. wt. 685) was added and the solution stirred under nitrogen at 23° for one hour. The solution was then poured into 4 liters of methanol containing 100 ml of conc. hydrochloric acid. After filtering, methanol washing, and drying, the product weighed 16.1 g. Infrared and NMR analysis confirmed the desired acetylated product was obtained. NMR showed 84% of the aromatic rings were acetylated assuming, as would be expected, that only one acetyl group per aromatic ring can be added. The inherent viscosity of a 0.4% solution of the poly(alpha-methylstyrene) in benzene was 0.074; the acetylated product 0.083.

B. The product of part A (2.5 g) was dissolved in 25 ml 1,2-dimethoxymethane and absolute ethanol added to the point of incipient cloudiness (12.5 ml). Sodium borohydride (1.5 g) was added and the solution stirred at 40° for 1.5 hrs. The solution was poured into 450 ml water and then heated to boiling for 0.5 hr. The product was filtered, water washed and dried (weight 2.4 g). Infrared analysis showed reduction of the ketone to the alcohol had occurred quantitatively.

C. A solution of 0.6 g. of the product of part B, 2.4 g. tertbutylhydroquinone and 0.2 g. anhydrous p-toluenesulfonic acid in 40 ml benzene was refluxed for 5 hrs. The solution was poured into 300 ml hexane. The precipitated product was filtered, then dissolved in 25 ml of N-methyl-2-pyrrolidone, (NMP) and the resulting solution precipitated into 250 ml water. The precipitate was filtered and then slurried several times with boiling water. After drying the product weighed 0.86 g. The product had an inherent viscosity (0.4% in NMP) of 0.16; the starting poly(alpha-methylstyrene) (mol. wt. 685) was 0.096. The hydroxyl number (milli-equivalents (meq) of hydroxyl/g) of the product by acetylation was 3.9.

D. The effectiveness of the product of part C as an antioxidant for corn oil was tested using the active oxygen method (AOM) for fat stability (American Oil Chemists' Society tentative method Cd. 12–57). The AOM measures the time in hours required for the oil sample to attain a predetermined peroxide value, usually 100 meq of peroxide per kilogram of oil. The time required for a sample of corn oil containing 200 ppm of the product to reach 100 meq of peroxide was 36 hours. A sample of neat corn oil required 16 hrs. The two most widely used commercial antioxidants, butylated hydroxyanisole (BHA) and butylated hydroxytoluene (BHT), gave times of 16 hrs and 20 hrs respectively under the same test conditions. The test antioxidant was used with a mixture of 500 ppm propylene glycol, 3,200 ppm glycerol mono-oleate and 500 ppm citric acid.

EXAMPLE II

The acute oral toxicity of the polymer prepared in Example 1 (part C) was determined in male and female albino rats. No test animals died at levels of 5.0 g/kg of body weight. The $LD_{50}$ is thus greater than 5.0 g/kg. In accordance with the Federal Hazardous Substances Act substances with an $LD_{50}$ of 5.0 g/kg are considered non-toxic by the oral route of administration.

EXAMPLE III

Example 1, part A, was repeated using nitrobenzene as the reaction solvent in place of carbon disulfide. The use of a different solvent did not affect the reaction.

EXAMPLE IV

Example 1 was repeated using a poly(alpha-methylstyrene) of mol. wt. 960. Resulting product was equivalent to the product of Example I but with a higher molecular weight.

EXAMPLE V

Example 1 was repeated a polystyrene of mol. wt. 22,000 in place of the poly(alpha-methylstyrene). When tested as in Part D of Example 1, the AOM time was 36 hrs. The yeild of acetylated polystyrene via the procedure of part A was 11.0 g, starting with 10.4 g of polystyrene. The inherent viscosity (0.4% in NMP) of the product obtained via the procedure of part C was 0.26; the starting polystyrene, 0.16.

EXAMPLE VI

Benzyl chloride was polymerized in nitrobenzene solution using aluminum chloride as catalyst. The resulting polymer had an inherent viscosity (0.4% in benzene) of 0.08; corresponding to a mol. wt. of about 1,000. Example 1 was repeated using this polymer. The AOM time was 38 hours.

EXAMPLE VII

Example 1 was repeated using a commercial poly(vinyltoluene) (inherent visc. 0.4% in benzene, 0.25). The AOM time of the product was 32 hours.

EXAMPLE VIII

Example 5 was repeated but using chlorobenzene as the reaction solvent in the part A procedure instead of carbon disulfide; 12.0 g of polystyrene yielded 12.6 g of acetylated polystyrene. The AOM time of the final polymeric antioxidant product was 40 hours.

EXAMPLE IX

Example 1, part B, was repeated using tetrahydrofuran instead of 1,2-dimethoxyethane. Also after precipitation of the reaction solution into water, the water mixture was stirred at room temperature for several hours. The use of tetrahydrofuran did not affect the results.

EXAMPLE X

Example 1 was repeated but using a commercial poly(2,6-dimethyl-p-phenylene oxide) [PPO, mol. wt. 17,000]. The AOM time of the final product was 32 hrs.

EXAMPLE XI

Example 1 was repeated using a commercial poly(2-vinylnaphthalene). The AOM time of the final product was 30 hours.

EXAMPLE XII

The final polymeric antioxidants obtained from Example 1 and Example 10 were tested as in part D, Example 1 but using safflower oil instead of corn oil. Neat safflower oil required 11 hours to reach 100 meq of peroxide. With the polymer of Example 1 the time was 21 hrs.; with the polymer of Example 10, 22 hours.

What is claimed is:

1. A composition comprising a polymer of a polymeric alkylaromatic hydroquinoid compound and an oxidizable organic material normally subject to adverse effects by oxygen, selected from the group consisting of lipids including animal and vegetable fats and oils, polymers, mineral oils and gasoline, wherein the oxidizable organic material is stabilized against oxidative degradation by a stabilizing amount of the polymer, said polymer having the structure

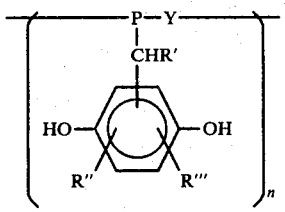

(a) P is selected from the group consisting of (i)

where R is selected from the group consisting of hydrogen and an alkyl group of 1 to 26 carbon atoms, Ar is substituted and unsubstituted and is selected from the group consisting of benzenoid ring moieties of 6 to 24 carbon atoms, said substituents being one or more alkyl groups of 1 to 26 carbon atoms, and (ii) substituted and unsubstituted aromatic moieties comprising phenyl moieties, substituents of said substituted aromatic moieties comprising one or more alkyl groups of 1 to 26 carbon atoms;

(b) Y is selected from the group consisting of —CH$_2$—, —O—, —S—, —CH(CH$_3$)—, —C(CH$_3$)$_2$—and phenyl moieties;

(c) R' is selected from the group consisting of an alkyl group of 1 to 26 carbon atoms, and an aromatic moiety selected from the group consisting of a benzenoid group of 6 to 24 carbon atoms, the said aromatic moiety being substituted and unsubstituted, said substituents being one or more alkyl groups of 1 to 26 carbon atoms;

(d) R" and R'" are independently selected from the group consisting of hydrogen and an alkyl group of 1 to 26 carbon atoms.

(e) n is an integer from 2 to 200.

2. The composition of claim 1 wherein the said polymeric alkyl aromatic hydroquinoid compound is the reaction product of (A) a polymeric aromatic compound comprising said P and Y, (B) an acyl compound R'COX wherein X is selected from the group consisting of halogen, an —OH group and an acid anhydride group of R'COO—, and (C) a hydroquinone compound having at least one replaceable ring hydrogen, and wherein the mole ratio of said aromatic polymer of A to said acyl compound of B is 1:1, the hydroquinone compound of (C) is present in excess, n is an integer of 2 to 200, and the molecular weight of said polymeric alkyl aromatic hydroquinoid compound is within the range of from about 500 to about 50,000.

3. The composition of claim 2 wherein said hydroquinone compound is selected from the group consisting of 1,4-dihydroxybenzene; 2,3- or 2,5- or 2,6-dimethyl-1,4-dihydroxybenzene; 2-ethyl-1,4-dihydroxybenzene; 2-t-butyl-1, 4-dihydroxybenzene; 2-methyl-5-t-butyl-1, 4-dihydroxybenzene; 2-(2-phenylethyl)-1,4-dihydroxybenzene; and 2,4-di(2(4-vinyl) phenylethyl)-1,4-dihydroxybenzene.

4. The composition of claim 2 wherein said polymeric alkyl aromatic hydroquinoid compound is the reaction product of (A) a polymeric aromatic compound selected from the group consisting of polystyrene, poly(alpha-methylstyrene), poly(vinyltoluene), poly(2-vinylnaphthalene and poly(2,6-dimethylphenylene oxide), (B) acetyl chloride and (C) tert-butyl hydroquinone.

5. The said composition of claim 4 wherein said polymeric aromatic compound polymer is polystyrene.

6. The said composition of claim 4 wherein said aromatic compound is poly(alpha-methylstyrene).

7. The said composition of claim 4 wherein said polymeric aromatic compound is poly(vinyltoluene).

8. The said composition of claim 4 wherein said polymeric aromatic compound is poly(2,6-dimethyl-phenylene oxide).

9. The composition of claim 1 wherein the said stabilizing amount of said polymer is within the range of from about 2 to 50,000 parts per million, basis oxidizable material.

10. The composition of claim 1 wherein the oxidizable organic material comprises at least one member selected from the group consisting of lard, sunflower oil, soybean oil, safflower oil, cottonseed oil, peanut oil, and corn oil.

11. The composition of claim 1 wherein R is selected from the group consisting of hydrogen and a methyl moiety.

12. The composition of claim 1 wherein Ar is a benzene moiety.

13. The said composition of claim 4 wherein said polymeric aromatic compound is poly(2-vinylnaphthalene).

14. An alkyl aromatic hydroquinoid compound of the formula

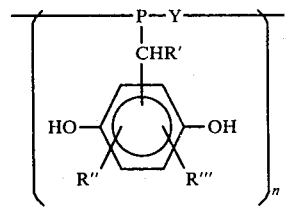

wherein (a) P is selected from the group consisting of (i)

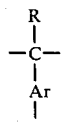

wherein R is selected from the group consisting of hydrogen and an alkyl group of 1 to 26 carbon atoms, Ar is substituted and unsubstituted and is selected from the group consisting of benzenoid ring moieties of 6 to 24 carbon atoms, said substituents being one or more alkyl groups of 1 to 26 carbon atoms, and (ii) substituted and unsubstituted aromatic moieties comprising phenyl moieties, substituents of said substituted aromatic moieties comprising one or more alkyl groups of 1 to 26 carbon atoms;

(b) Y is selected from the group consisting of $-CH_2-$, $-O-$, $-S-$, $-CH(CH_3)-$, $-C(CH_3)_2-$ and phenyl moieties;

(c) R' is selected from the group consisting of an alkyl group of 1 to 26 carbon atoms, and an aromatic moiety selected from the group consisting of a benzenoid moiety of 6 to 24 carbon atoms, the said aromatic moiety being substituted and unsubstituted, said substituents being one or more alkyl groups of 1 to 26 carbon atoms;

(d) R" and R'" are independently selected from the group consisting of hydrogen and an alkyl group of 1 to 26 carbon atoms.

(e) n is an integer from 2 to 200 and the molecular weight of said compound is within the range of from about 500 to 50,000.

15. The compound of claim 14 wherein Ar is selected from the group consisting of phenyl, naphthyl, biphenyl, diphenylmethane, diphenylether, and diphenylsulfide moieties.

16. The compound of claim 14 wherein P is

$-CH_2-$, Ar is phenyl, R and R" are hydrogen, R'" is a tertiarybutyl group and R' is a methyl group.

17. The compound of claim 14 wherein the said hydroquinone compound is selected from the group consisting of 1,4-dihydroxybenzene; 2,3-or-2,5-, or 2,6-dimethyl-1,4-dihydroxybenzene; 2-ethyl-1,4-dihydroxybenzene; 2-t-butyl-1,4-dihydroxybenzene; 2-methyl-5-t-butyl-1,4-dihydroxybenzene; 2-(2-phenylethyl)-1,4-dihydroxybenzene; and 2,4-di(2-(4-vinyl)phenethyl)-1,4-dihydroxybenzene.

18. The compound of claim 14 wherein the said hydroquinoid compound is the reaction product of (A) an aromatic compound selected from the group consisting of polystyrene, poly(alphamethylstyrene), poly(vinyltoluene, poly(2-vinylnaphthalene and poly(2,6-dimethylphenylene oxide), (B) acetyl chloride and (C) tert-butyl hydroquinone.

19. The compound of claim 18 wherein said polymeric aromatic compound is polystyrene.

20. The compound of claim 18 wherein said polymeric aromatic compound is poly(2-vinylnaphthalene).

21. The compound of claim 18 wherein said polymeric aromatic compound is poly(alpha-methyl styrene).

22. The compound of claim 18 wherein said polymeric aromatic compound is poly(vinyltoluene).

23. The compound of claim 18 wherein said polymeric aromatic compound is poly(2,6-dimethyl-phenylene oxide).

* * * * *

UNITED STATES PATENT OFFICE
CERTIFICATE OF CORRECTION

Patent No. 4,307,012     Dated  Dec. 22, 1981

Inventor(s)    Carl Serres, Jr.

It is certified that error appears in the above-identified patent and that said Letters Patent are hereby corrected as shown below:

| Patent | | |
|---|---|---|
| Col. | Line | |
| 3 | 60 | "$R_{40}$" should be --$R'$-- |
| 14 | diagram | (omission) after " $\overset{R}{\underset{}{}}$ ", insert --Y is-- $\overset{}{\underset{Ar}{-C-}}$ |

Signed and Sealed this

Ninth Day of November 1982

[SEAL]

Attest:

Attesting Officer

GERALD J. MOSSINGHOFF

Commissioner of Patents and Trademarks